3,055,886
PROCESS FOR CONDENSATION OF SULFANIL-
AMIDE WITH HALODIAZINES
Kenneth Goodemoot, Franklin Township, Somerset County, and Richard J. Turner, Westfield, N.J., assignors to American Cyanamid Company, New York, N.Y., a corporation of Maine
No Drawing. Filed Feb. 12, 1960, Ser. No. 8,217
6 Claims. (Cl. 260—239.7)

This invention relates to an improved process for the preparation of sulfanilamidodiazines. More particularly, it deals with fusion reactions of sulfanilamide with a mono- or dihalopyridazine or pyrimidine having a halogen alpha to a diazine ring nitrogen. Specifically, the halogen may be bromine or chlorine. This application is a continuation-in-part of our copending application Serial No. 704,288, filed December 23, 1957, now abandoned.

Taking chlorine as the illustrative halogen, the process may be illustrated by the following reaction:

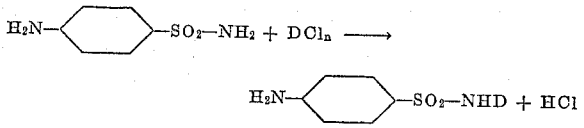

wherein D is a diazine ring residue of pyridazine or pyrimidine, each chlorine being attached to a ring carbon and "n" is one or two. One "Cl" in "DCl$_n$" must be alpha to a ring nitrogen. When "n" is one, the diazine ring in the product has no halogen substituent. When "n" is two, the diazine ring in the product has one halogen substituent.

One method for preparing sulfanilamidohalopyrazines is described in U.S. Patent No. 2,475,673 and British Patent No. 612,835. As illustrated therein, sulfanilamide is reacted with a dichloropyrazine at a temperature high enough to result in fusion, usually some 120°–175° C., in the presence of a solid acid acceptor such as an alkali metal carbonate. Reacted mixtures are taken up in water and the desired product is separated from solution. Although bromodiazines may be used, as in the present invention, due to higher costs they are seldom employed.

This process operates very well in the case of monohalopyrazines. In reacting a dihalopyrazine a problem becomes noticeable in that the reaction mass is less fluid than when using monohalopyrazine. Stirring is less effective. As shown in the above-noted patent, this may be overcome by adding an inert solvent for all or part of one of the reactants.

However, this problem becomes more pronounced when it is attempted to substitute halopyrimidines for the halopyrazines and acute with halopyridazines. Frequently it becomes almost impossible to stir or agitate the mixture effectively, particularly during the latter part of the reaction period. This is a serious disadvantage. In some cases, particularly when attempting to react halopyridazines, it results in quite unsatisfactory yields. A further disadvantage is in the additional processing which becomes necessary, when, as often occurs, the fusion mass sets to a solid mass which is difficult to dissolve in water, i.e., in a normal procedure in the conventional purification of sulfa drugs.

Moreover, the presence of water does not help in maintaining sufficient fluidity. Not only water but such other solvents as glycerine, ethylene glycol, pyridine and other heterocyclic bases, and such aromatic hydrocarbons such as decalin, toluene, xylene and the like do not produce the desired result. Moreover, the yield frequently is lower when such solvents are used, and in many cases low purity results.

These factors have caused the process, the reaction of which is otherwise potentially economical, to be considered unsuitable for general practical commercial use, particularly in preparing halopyrimidine and halopyridazine derivatives. Therefore the reaction is generally carried out in solution in some inert solvent. Nevertheless, if these problems could be eliminated, the fusion process would be more desirable.

The present invention is based on a discovery that the noted difficulties can be avoided if the reaction is carried out in the presence of certain specific organic compounds. Since solvent power does not seem to be a factor, these compounds are herein designated as "fluidizing agents." They include namely, acetamide, benzamide, polyglycols having an average molecular weight of about 1200 or more, lower alkyl ethers of polyalkylene glycols such as the mono- and di-methyl and ethyl ethers of diethylene glycol and alkylene glycols in which the alkyl moiety contains more than two carbons such as butylene and dipropylene glycols.

The properties peculiar to the different types of material which can be used in the present invention which distinguish them from those which cannot are not understood. For example, as noted above, it is not solvent power. Moreover, although in each case materials which can be used have a boiling point sufficiently high to prevent their being boiled away during fusion, this is not a distinguishing characteristic since analogous materials having similar or higher boiling points are not useful.

Attempts to use other analogous materials produce anomalous results. For example, formamide gives yields far below even those obtained when no fluidizing agent is present, whereas acetamide increases the yield very greatly. Nor is it a matter of increased molecular weight since substituted formamides like dimethyl formamide produce no significant increase in yield. Another illustration of unique results is presented by triethylene glycol. It boils well above fusion temperatures, yet its presence greatly reduces the yield. In contrast therewith, some glycols of lower molecular weight such as butylene glycol give excellent results as does dipropylene glycol, a glycol of comparable molecular weight.

As was noted above, the result does not depend on solvent power, most of the common inert liquid solvents producing inferior results. These unexpected results with solvents, some of which are helpful in producing derivatives of halopyrazines, make the behavior of the particular fluidizing agents which can be usefully employed in the present invention in reacting halopyridazines even more surprising.

Although the fluidizing agents which are useful in each case produce improved fluidity and yield, the yields vary with different agents. Because of good yield and low cost, acetamide is perhaps to be preferred, with the diethyl ether of diethylene glycol being the next most desirable selection.

An advantage of the invention is that the amount of fluidizing agent to be used is not particularly critical. As little as one-third of the weight of the chlorodiazine gives good results. When the amount is reduced materially below about one-sixth of the weight of the chlorodiazine, however, the effectiveness begins to fall off. Below about one-eighth, the fluiding effect is not sufficiently great to render the process of commercial importance. Therefore, this is considered as a lower limit.

The upper limit is dictated only by economic considerations. As much as six times the weight of the chlorodiazine may be used. Still larger amounts than six times the weight of the chlorodiazine do not adversely affect the yield. However, even six times the weight of the chlorodiazine represents a very marked increase in cost. There is no particular advantage in using an amount more than about equal to the weight of the halodiazine.

Reaction temperatures also are not critical. In general, they must be high enough to fuse the mixture. Usually this will require at least 70° C. Use of temperatures above 150° C. tends to discolor the resulting product making it less satisfactory. In general, therefore, temperatures should not exceed 160° C. for good results. Preferably, the best results are normally expected between about 80° and 150° C. This is further discussed below.

An additional advantage of the invention is that it is quite flexible in operation. Thus, it is not necessary to add the fluidizing agent at any particular time or even all at one time. For example, the whole amount of the agent may be introduced before fusion, and for some purposes, this represents a simplification of procedure. However, equally good results are obtained if the addition in one or more portions is made while the reaction is proceeding to maintain fluidity. In other words, additions need be made only when the mixture becomes too thick for efficient agitation.

The present invention is not concerned in any way with the recovery of the product from the reacted fusion mixture. This is effected by conventional means involving initially dissolving the fusion product in water. However, the nature of the fusion product obtained according to the present process makes it more easy to dissolve. Thereby recovery of the ultimate product is facilitated by use of this invention even though it does not change the procedural steps employed.

The invention will be described in greater detail in conjunction with the folowing illustrative examples. Therein all the parts and percentages are expressed by weight unless otherwise specified. Since the halodiazines are not all equally reactive, halopyrazines being the most reactive and halopyrimidines and halopyridazines being progressively less so, halopyridazines as the least reactive are taken as illustrative.

EXAMPLE 1

25 parts of 3,6-dichloropyridazine, 20 parts of acetamide, 100 parts of sulfanilamide, and 41 parts of potassium carbonate are introduced into a reaction vessel and the mixture heated with stirring until the temperature reaches approximately 133° C. At this temperature, the reaction becomes exothermic, and the temperature rises gradually to 145° C., the reaction mixture remaining fluid throughout the heating period. After reaction is complete, the mixture is treated with 200 parts of water and clarified at 90° C., using decolorizing charcoal. The pH of the filtrate is then adjusted to 8.7–8.9 by the addition of concentrated hydrochloric acid and the mixture cooled to 15° C. The unreacted sulfanilamide is removed by filtration. The filtrate is again clarified with decolorizing charcoal and is treated at 65° C. with acetic acid until the pH is brought to about 6. Thereupon the mixture is cooled to 20–25° C. and 3-sulfanilamido-6-chloropyridazine removed by filtration. The product is 99.7% pure and the yield, based on the dichloropyridazine is 83.5%.

EXAMPLE 2

The procedure of Example 1 is repeated, using no fluidizing agent. The reaction mixture is extremely difficult to stir, but is processed until an optimum yield is obtained. A yield of only 55.5% is obtained.

EXAMPLE 3

The procedure of Example 1 is repeated but substituting for the acetamide a comparable amount of a number of different materials. In no test is the resultant yield as high as in Example 1 although the product purity is equivalent.

A summary of the results obtained in Examples 1–3 is presented in the following table. As given therein, the yield is based on the 3,6-dichloropyridazine. The above-noted anomalous behavior of formamide and dimethyl formamide as compared with acetamide and of triethylene glycol as compared with dipropylene glycol and 1,3-butyleneglycol is clearly shown.

Table
PREPARATION OF 3-SULFANILAMIDO-6-CHLOROPYRIDAZINE

| Fluidizing Agent | Percent Yield | Fluidizing Agent | Percent Yield |
| --- | --- | --- | --- |
| None | 55.5 | 1,3-Butyleneglycol | 64.2 |
| Acetamide | 83.5 | Dipropylene glycol | 64.8 |
| Benzamide | 74.5 | Polyglycol (mol. wt. 1200) | 74.6 |
| Diethyl ether of Diethylene glycol | 81.6 | Dimethylformamide | 58.6 |
| Monoethyl ether of Diethylene glycol | 66.3 | Triethylene glycol | 43.8 |
|  |  | Formamide | 33.1 |

EXAMPLE 4

A charge of 6.0 parts of acetamide (1.02 mol), 12.9 parts of sulfanilamide (0.75 mol), 8.7 parts of potassium carbonate (0.625 mol) and 3.73 parts of 4,6-dichloropyrimidine (0.03 mol) is heated rapidly with stirring to a temperature of 120°–125° C. and maintained at this temperature for about 20 minutes. Water is then added to a total volume of about 50 parts and the solution clarified at about 90° C., by filtration. To the filtrate is added about 110 parts of normal aqueous hydrochloric acid and the mixture cooled to ambient temperature resulting in the precipitation of 4-sulfanilamido-6-chloropyrimidine (77% of theory) which is recovered by filtration. The product is recrystallized from acetonitrile. It has a first melting point of about 190° C., when inserted in a bath at 180°–185° C., but immediately recrystallizes and has a second melting point at about 350° C.

EXAMPLE 5

To illustrate the effect of lowering the reaction temperature, the procedure of Example 4 is repeated keeping the average temperature during the reaction period at an average of about 80° C. The same product is produced.

EXAMPLE 6

To further illustrate the importance of the fluidizing agent, it is attempted to repeat the procedure of Example 4 with the exception that the acetamide is omitted from the mixture. It is impossible to obtain a reactive fusion melt at the temperature range of either of Examples 4 and 5.

It is also an advantage of the present invention that if so desired the halodiazine ring may contain other substituents, as for example a methoxy or ethoxy group without departing from the intended scope of the invention. This is illustrated in the following example.

EXAMPLE 7

A mixture of 0.434 part (0.003 mol) of 4-chloro-6-methoxypyrimidine, 1.55 parts (0.009 mol) of sulfanilamide, 1.035 parts (0.0075 mol) of potassium carbonate and 0.363 part (0.0061 mol) of acetamide is heated at about 155°–160° C. for about 10 minutes. After cooling to about 25° C., the reaction mass is dissolved in 10 parts of aqueous sodium hydroxide (1 N) and the pH of the resulting solution is adjusted to 8.0 with normal aqueous hydrochloric acid. The precipitate of sulfanilamide is filtered off and the filtrate is treated with additional aqueous hydrochloric acid to a pH of 3.5–4.0. A 25% yield of 4-sulfanilamido-6-methoxypyrimidine is obtained.

It was noted above that temperatures of at least about 70° C. are required and in general temperatures above about 160° C. should be avoided. In general this range of some 70°–160° C. represents the useful range. However, as can be seen from the preceding example, the choice of a temperature within this range will depend not only on the particular fluidizing agent, but also on the diazine. Halo substituents are more reactive when on a pyrimidine ring than on a pyridazine ring.

Therefore, the above-noted 70°–160° C. temperature range should be considered as comprising a range of from about 70° to about 135° C., when reacting halopyrimidines and from about 120° to about 160° C. when reacting halopyridazines. In general, the most useful range will be found to be from about 80° to about 125° using halopyrimidines and from about 130° to about 150° C. for halopyridazines.

However, use of the 70°–135° C. range for halopyrimidines is predicated on two assumptions. The first is that there are only halo substituents on the diazine ring. As shown for instance in Example 7 above, the presence of other substituents makes preferable the use of temperatures in the upper part of the 70°–160° C. range and usually in the same general range preferred for halopyridazines.

The second assumption has reference to the reaction of dihalopyrimidines. Both halogens of a dihalodiazine apparently are not equally reactive. The assumption is that only one halogen is to be replaced. If the reaction temperature at which the melt is maintained is sufficiently high, both halogens can be replaced. However, within the temperature ranges indicated, it appears that substantially all of the halogen in the more reactive position is replaced before any appreciable replacement of the second halogen occurs.

In the case of dihalopyridazines this point is not of particular importance since the second halogen does not appear particularly reactive at temperatures below about 160° C., and even less so in the preferred 130°–150° C. range. In general, this is an advantage since it is preferred to retain the halo substituent. The same is true of dihalopyrimidines. In the preferred range of 80°–125° C., the second halogen shows no appreciable reactivity.

In the case of dihalopyrimidines, however, if the second chlorine or other substituent is to be retained, the reaction temperature must be maintained below about 130°–135° C. Since there the reaction develops heat, some provision for cooling will therefore be necessary in many cases. Otherwise, the reaction temperature may rise by self-heating to about 150°–155° C., and in some cases may go even higher. Under such conditions, the second halogen, of a dihalopyrimidine, may become highly active. Therefore, in reacting dihalopyrimidines if one chlorine, or other halogen substituent, is to be retained, temperatures above about 125°–130° C. should be avoided. If the replacement of both halogens is desired, the temperature should be above about 145°–150° C. This is shown for instance by comparing Examples 4 and 5 above with the following example. Therefore, the general range of 70°–160° C. is applicable to both halopyrimidines and halopyridazines.

EXAMPLE 8

The reaction mixture of Example 4 is used in the procedure of that example except that the reaction temperature range is allowed to rise to about 150°–155° C. and is maintained for about 20 minutes. The recovered and recrystallized product contains no halogen on the pyrimidine ring and is found to be 4,6-disulfanilamidopyrimidine.

We claim:

1. In the process of preparing a compound selected from the group consisting of the aminobenzenesulfonamido- and aminobenzenesulfonamidomonohalo-pyrimidines and pyridazines by mixing the corresponding halodiazine and sulfonilamide with an alkali metal carbonate and heating the mixture at a fusion temperature above about 70° C., until reaction substantially ceases, the improvement which comprises: adding to said mixture on a weight basis an amide selected from the group consisting of acetamide and benzamide in amounts of from about one-eighth to about six parts of amide per part of halodiazine and maintaining active agitation of the fusion mass until reaction is substantially complete.

2. In the process of preparing a compound selected from the group consisting of the aminobenzenesulfonamido- and aminobenzenesulfonamidomonohalo- pyrimidines and pyridazines by mixing the corresponding halodiazine and sulfanilamide with an alkali metal carbonate and heating the mixture at a fusion temperature above about 70° C., until reaction substantially ceases, the improvement which comprises: adding to said mixture on a weight basis a lower alkyl ether of diethyleneglycol in amounts of from about one-eighth part to about six parts of glycol per part of halodiazine and maintaining active agitation of the fusion mass until reaction is substantially complete.

3. A process according to claim 2 in which said ether is the diethyl ether of diethylene glycol.

4. In the process of preparing a compound selected from the group consisting of the aminobenzenesulfonamido- and aminobenzenesulfonamidomonohalo-pyrimidines and pyridazines by mixing the corresponding halodiazine and sulfonilamide with an alkali metal carbonate and heating the mixture at a fusion temperature above about 70° C., until reaction substantially ceases, the improvement which comprises: adding to said mixture on a weight basis a polyglycol having a molecular weight of at least about 1200 in amounts of from about one-eighth part to about six parts of glycol per part of halodiazine and maintaining active agitation of the fusion mass until reaction is substantially complete.

5. In the process of preparing a compound selected from the group consisting of the aminobenzene-sulfonamido- and aminobenzenesulfonamidomonohalo-pyrimidines and pyridazines by mixing the corresponding halodiazine and sulfonilamide with an alkali metal carbonate and heating the mixture at a fusion temperature above about 70° C., until reaction substantially ceases, the improvement which comprises: adding to said mixture on a weight basis dipropylene glycol in amounts of from about one-eighth to about six parts of glycol per part of halodiazine and maintaining active agitation of the fusion mass until reaction is substantially complete.

6. In the process of preparing a compound selected from the group consisting of the aminobenzenesulfonamido- and aminobenzenesulfonamidomonohalo-pyrimidines and pyridazines by mixing the corresponding halodiazine and sulfonilamide with an alkali metal carbonate and heating the mixture at a fusion temperature above about 70° C., until reaction substantially ceases, the improvement which comprises: adding to said mixture on a weight basis butylene glycol in amounts of from about one-eighth to about six parts of glycol per part of halodiazine and maintaining active agitation of the fusion mass until reaction is substantially complete.

(References on following page)

References Cited in the file of this patent

UNITED STATES PATENTS

| | | |
|---|---|---|
| 2,403,776 | Winnek | July 9, 1946 |
| 2,430,439 | Winnek et al. | Nov. 4, 1947 |
| 2,606,903 | Ruskin | Aug. 12, 1952 |
| 2,703,800 | Bretschneider et al. | Mar. 8, 1955 |

OTHER REFERENCES

Rose et al.: The Condensed Chemical Dictionary, 5th Ed., Reinhold Publ. Co., New York, pages 190, 403, 714, 883 and 910 (1956).